US012577335B2

(12) United States Patent
Al-haj Ali et al.

(10) Patent No.: US 12,577,335 B2
(45) Date of Patent: Mar. 17, 2026

(54) PROCESS FOR THE POLYMERIZATION OF OLEFINS IN SOLUTION COMPRISING DEACTIVATING THE POLYMERIZATION CATALYST BY HEAT

(71) Applicant: Borealis AG, Vienna (AT)

(72) Inventors: Mohammad Al-haj Ali, Kulloo (FI); Michiel Bergstra, Beringen (BE); Erik Eriksson, Stenungsund (SE); Sameer Vijay, Linz (AT); Christof Wurmitsch, Linz (AT); Samuli Zitting, Kulloo (FI); Henry Sleijster, Sittard-Geleen (NL); Noureddine Ajellal, Kulloo (FI)

(73) Assignee: BOREALIS GMBH, Vienna (AT)

( * ) Notice: Subject to any disclaimer, the term of this patent is extended or adjusted under 35 U.S.C. 154(b) by 938 days.

(21) Appl. No.: 17/774,967

(22) PCT Filed: Dec. 7, 2020

(86) PCT No.: PCT/EP2020/084905

§ 371 (c)(1),
(2) Date: May 6, 2022

(87) PCT Pub. No.: WO2021/136629

PCT Pub. Date: Jul. 8, 2021

(65) Prior Publication Data

US 2022/0380498 A1     Dec. 1, 2022

(30) Foreign Application Priority Data

Jan. 2, 2020     (EP) ..................................... 20150102

(51) Int. Cl.
| | |
|---|---|
| *C08F 210/16* | (2006.01) |
| *C08F 4/659* | (2006.01) |
| *C08F 10/02* | (2006.01) |
| *C08F 6/02* | (2006.01) |

(52) U.S. Cl.
CPC ........ *C08F 210/16* (2013.01); *C08F 4/65908* (2013.01); *C08F 6/02* (2013.01); *C08F 2410/00* (2013.01)

(58) Field of Classification Search
CPC ............. C08F 6/02; C08F 6/08; C08F 210/16
See application file for complete search history.

(56) References Cited

U.S. PATENT DOCUMENTS

| | | | |
|---|---|---|---|
| 5,599,885 A | 2/1997 | Kawasaki et al. | |
| 5,811,619 A | 9/1998 | Commereuc et al. | |
| 8,269,055 B2 * | 9/2012 | Fritz | C07C 2/08 |
| | | | 585/521 |
| 12,162,965 B2 * | 12/2024 | Wang | B01J 19/2445 |
| 2019/0264014 A1 * | 8/2019 | Sasaki | C08F 290/042 |

FOREIGN PATENT DOCUMENTS

| | | | | |
|---|---|---|---|---|
| EP | 0259965 A2 | 3/1988 | | |
| EP | 0703929 A1 | 4/1996 | | |
| EP | 1748039 A | 1/2007 | | |
| WO | WO-2017213216 A1 * | 12/2017 | | C08L 23/00 |
| WO | 2019162456 A1 | 8/2019 | | |

OTHER PUBLICATIONS

International Search Report from PCT/EP2020/084905 dated Feb. 5, 2021.

* cited by examiner

*Primary Examiner* — Rip A Lee
(74) *Attorney, Agent, or Firm* — Lippes Mathias LLP

(57)     ABSTRACT

The present invention relates to a polymerization process, comprising: a) supplying a feed containing ethylene and at least one alpha-olefin having 3 to 12 carbon atoms in a hydrocarbon solvent to a polymerization reactor, b) contacting the feed of step a) in the reactor with a catalyst to form a reaction mixture containing an ethylene-alpha-olefin co-polymer, c) withdrawing the reaction mixture from the polymerization reactor as a reactor outlet stream which comprises the ethylene-alpha-olefin co-polymer, unreacted monomer and comonomer, catalyst, and hydrocarbon solvent, d) heating the reactor outlet stream to a temperature which is at least 5° C. higher than the temperature of the reaction mixture at the outlet of the reactor for a time period of between 1 and 250 seconds in order to de-activate the polymerization catalyst, and e) separating hydrocarbon solvent, monomer and comonomer from the reactor outlet stream and recycling it back to the polymerization reactor without further purification steps.

11 Claims, 1 Drawing Sheet

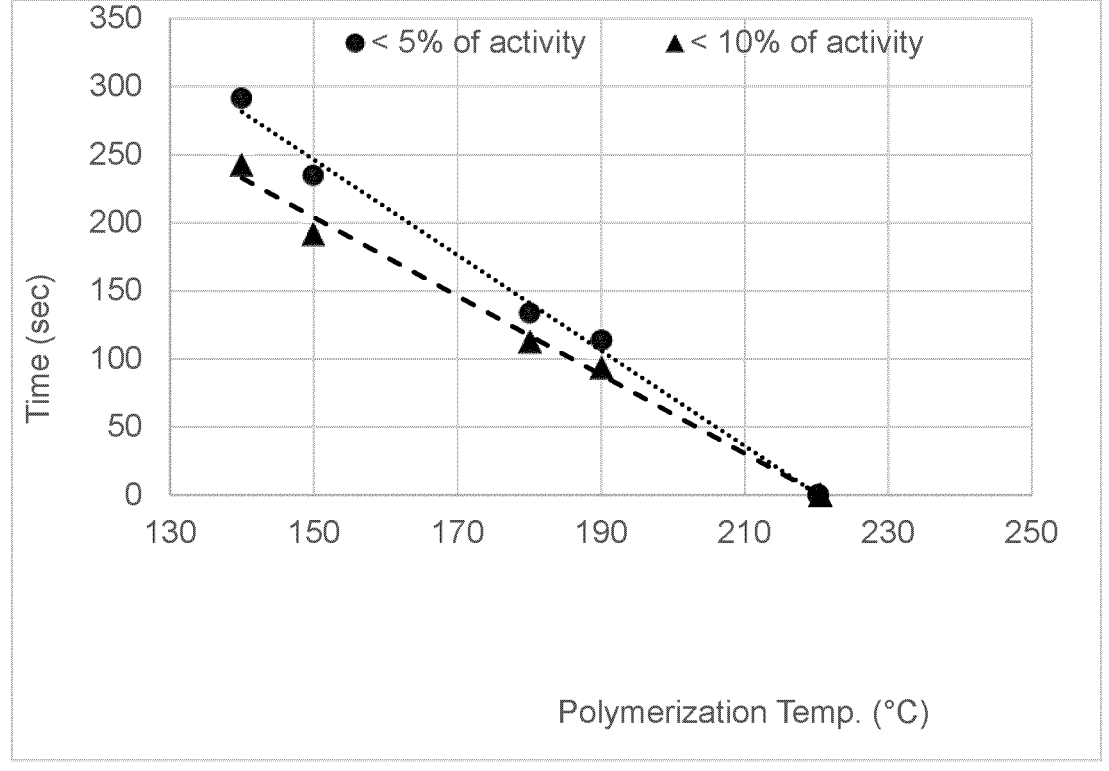

PROCESS FOR THE POLYMERIZATION OF OLEFINS IN SOLUTION COMPRISING DEACTIVATING THE POLYMERIZATION CATALYST BY HEAT

CROSS REFERENCE TO RELATED APPLICATIONS

This is a 371 of PCT Application No. PCT/EP2020/084905, filed Dec. 7, 2020, which claims the benefit of European Application No. 20150102.0, filed Jan. 2, 2020, the contents of which are incorporated herein in their entirety.

The present invention is concerned with a process for the polymerization of olefin monomers in solution in the presence of a polymerization catalyst wherein the reactor outlet stream is heated in order to de-activate the polymerization catalyst before feeding the outlet stream to a low pressure separator.

In polyolefin production processes the catalyst has to be de-activated after the polymerization reaction. This is typically done downstream of the removal of the monomer from the produced polymer by adding a deactivation agent. In this manner, monomer can be recycled back to the reactor without poisoning of the catalyst in the reactor by carrying over traces of de-activation agent.

However, in solution polymerization this sequence is problematic because the initial low pressure separation as typically used in a solution polymerization sequence removes hydrogen, monomer(s), co-monomer(s) and solvent only imperfectly. Thus, the concentration of mainly the higher boiling components such as co-monomer(s) and solvent, which remain in the mixture is significant and with the catalyst still being active, uncontrolled polymerization can occur. Moreover, the residence time in such initial low pressure separation cannot be neglected in view of the rapid polymerization reaction in solution.

Thus, in solution polymerization the de-activation of the polymerization catalyst usually precedes the removal of the monomer(s), co-monomer(s) and the like. Such sequence is inter alia described in US 2011/0172375 and WO 2009/126277. The de-activation of the polymerization catalyst is secured by use of a de-activation agent. However, addition of a de-activation agent to the reactor outlet stream may cause de-activation agent and its deactivation products to be present in the recycling streams and hence contamination of the feed streams to the reactor.

Typical de-activation agents are water in the form of steam or in liquid form, or alcohols such as methanol or isopropanol. Use of methanol is described for example in US 2011/0172375. When using alcohols two further separation steps, i.e. a water-alcohol separation followed by a drying step are necessary. In addition to that the widespread use of isopropanol results in formation of hydrochloric acid, causing corrosion and also fouling problems.

Instead of using a liquid de-activation agent a solid de-activation agent may be used. WO 2009/126277 discloses the use of sodium or calcium stearate. However, use of solid de-activation agents requires the presence of further equipment for its removal, such as a further column, dryer bed, stripper or the like.

It is the object of the present invention to provide a process for the polymerization of olefin monomers in solution which allows for a recycling of the monomers, which are separated from the polymeric product downstream of the polymerization reactor, back to the reactor minimizing or even avoiding completely that trace amounts of a de-activation agent are "co-recycled" to the reactor in a simple and effective manner.

The present invention is based on the finding that this object can be achieved by heating the outlet stream of the solution polymerization reactor to a temperature higher than the temperature of the reaction mixture at the outlet of the reactor for a defined time period, so that the catalyst is de-activated by the heat applied in a short time.

The present invention therefore provides a polymerization process, comprising:

a) supplying a feed containing ethylene and at least one alpha-olefin having 3 to 12 carbon atoms in a hydrocarbon solvent to a polymerization reactor, b) contacting the feed of step a) in the reactor with a catalyst to form a reaction mixture containing an ethylene-alpha-olefin co-polymer, c) withdrawing the reaction mixture from the polymerization reactor as a reactor outlet stream which comprises the ethylene-alpha-olefin co-polymer, unreacted monomer and comonomer, catalyst, and hydrocarbon solvent, d) heating the reactor outlet stream to a temperature which is at least 5° C. higher than the temperature of the reaction mixture at the outlet of the reactor for a time period of between 1 and 250 seconds in order to de-activate the polymerization catalyst, and e) separating hydrocarbon solvent, monomer and comonomer from the reactor outlet stream and recycling it back to the polymerization reactor without further purification steps.

The term "reactor outlet stream" designates a liquid stream directly withdrawn from the reactor comprising polymerization product, unreacted monomers and comonomers, catalyst and solvent.

Heating the reactor outlet stream to the prescribed temperature for the prescribed time period sufficiently de-activates the polymerization catalyst so that uncontrolled polymerization reactions in the low pressure separator are avoided. Thus, no de-activation agent needs to be added to the reactor outlet stream avoiding the disadvantages of a carrying over of such agents to the reactor with re-cycled monomers and/or solvent as described above.

It is, accordingly, preferred in the present invention that no catalyst de-activation agent is added before feeding the reactor outlet stream to separation stage e), which may take place in a low pressure separator.

Preferably, the reactor outlet stream between leaving the reactor and entering separation stage e) apart from being heated as defined herein in step d) is not subjected to any further treatment steps such as separation of components from the stream or addition of further components.

In a preferred embodiment, the reactor outlet stream is heated to a temperature which is at least 10° C. higher than the temperature of the reaction mixture at the outlet of the reactor, more preferably is at least 15° C. higher than the temperature of the reaction mixture at the outlet of the reactor, still more preferably is at least 20° C. higher than the temperature of the reaction mixture at the outlet of the reactor, still more preferably is at least 30° C. higher than the temperature of the reaction mixture at the outlet of the reactor, still more preferably is heated to a temperature which is at least 40° C. higher than the temperature of the reaction mixture at the outlet of the reactor and most preferably is heated to a temperature which is at least 50° C. higher than the temperature of the reaction mixture at the outlet of the reactor.

Usually, the temperature to which the reactor outlet stream is heated is at most 100° C. higher than the temperature of the reaction mixture at the outlet of the reactor, more preferably is at most 90° C. higher than the temperature of the reaction mixture at the outlet of the reactor, and most preferably is at most 70° C. higher than the temperature of the reaction mixture at the outlet of the reactor.

Preferably, the reactor outlet stream is heated to a temperature as herein prescribed for a time period of between 10 and 200 seconds, more preferably for a time period of between 15 and 180 seconds, still more preferably for a time period of between 20 and 180 seconds, still more preferably of between 40 and 170 seconds, still more preferably of between 50 and 160 seconds, and most preferably of between 60 and 150 seconds.

The reactor outlet stream is preferably heated to a temperature of at least 180° C., more preferably to a temperature of at least 190° C., still more preferably to a temperature of at least 200° C., and most preferably to a temperature of at least 210° C.

The reactor outlet stream is preferably heated to a temperature of at most 275° C., more preferably at most 260° C. and most preferably of at most 250° C.

In principle, when heating is applied for a longer time then a lower temperature can be used, and when a shorter time is used, a higher temperature must be used in order to de-activate the catalyst.

Thus, in a preferred embodiment of the process of the invention, the reactor outlet stream is heated for a time period t (min) to a temperature which is at least x (° C.) higher than the temperature of the reaction mixture at the outlet of the reactor complying with the relation:

$$t * x > 0.05,$$

in a further embodiment complying with the relation $t * x > 0.1$, in still a further embodiment complying with the relation $t * x > 0.2$, and in still a further embodiment complying with the relation $t * x > 0.5$.

After heat treatment of the reactor outlet stream, preferably no more than 10 wt. %, more preferably no more than 5 wt. %, still more preferably no more than 4 wt. % and most preferably no more than 2 wt. % of the catalyst is in an active state.

The process of the present invention is a process for the production of an ethylene polymer by polymerization of monomers of ethylene and at least one alpha-olefin having 3 to 12 carbon atoms in solution. In such solution polymerization processes, the monomers are usually polymerized at a temperature in which the polymer is dissolved in the solvent mixture, which is present in the reactor.

The at least one alpha-olefin comonomer is preferably selected from the group consisting of linear and cyclic olefins and di-olefins having from 3 to 12 carbon atoms and the mixtures thereof. More preferably, the comonomer is selected from the group consisting of linear olefins having from 3 to 12 carbon atoms and mixtures thereof, preferably 4 to 10 carbon atoms, most preferably 1-octene.

Typically, the solution polymerization process is a high temperature solution polymerization process, using a polymerization temperature of greater than 100° C.

Preferably, the polymerization temperature is at least 110° C., more preferably at least 120° C.

The temperature in the polymerization reactor(s) is such that the polymer formed in the reaction is completely dissolved in the reaction mixture comprising the solvent, the monomers and comonomers, the polymer and, optionally, the chain transfer agent.

The co-monomer to monomer feed ratio of the process of the present invention is preferably between 0.0 and 1.8, more preferably between 0.05 and 1.7, and most preferably between 0.10 and 1.65.

The temperature is suitably greater than the melting temperature of the polymer. Thus, as the polymer is a co-polymer of ethylene, the temperature is suitably from 120 to 220° C., such as from 140 to 210° C. or from 150 to 200° C., depending on the content of co-monomer units in the polymer and depending on the catalyst in use.

The polymerization temperature can be up to 250° C.

The pressure in the solution polymerization reactor is preferably in a range of from 50 to 300 bar, preferably from 50 to 250 bar and more preferably from 70 to 200 bar.

The pressure of the reactor outlet stream usually corresponds to the pressure in the reactor.

Preferably, the process of the invention is a continuous process.

The polymerization is conducted in the presence of an ethylene polymerization catalyst.

Preferably, the process of the invention is a homogenously catalysed process.

Furthermore, the catalyst preferably is a metallocene catalyst, more preferably is a catalyst comprises a hafnocene catalyst, and still more preferably comprises a hafnocene catalyst complex, comprising a cyclopentadienyl (Cp) ligand, a fluorenyl (Flu) ligand and a covalent bridge connecting the two ligands.

When the catalyst comprises a hafnocene complex, preferably a boron based co-catalyst and/or an aluminoxane co-catalyst is used.

Most preferably, the polymerization is conducted in the presence of an olefin polymerization catalyst as described in any of WO 2018/178151, WO 2018/178152, WO 2018/108917, and WO 2018/108918.

In solution polymerization process a solvent is also present. The solvent is in liquid or supercritical state at polymerization conditions. The solvent is typically and preferably a saturated hydrocarbon solvent. The liquid hydrocarbon solvent used is preferably a saturated $C_{5-12}$-hydrocarbon, which may be unsubstituted or substituted by $C_{1-4}$ alkyl group such as pentane, methyl pentane, hexane, heptane, octane, cyclohexane, methylcyclohexane and hydrogenated naphtha, or mixture thereof. More preferably, unsubstituted saturated $C_{6-10}$-hydrocarbon solvents are used either in pure form (such as pure $C_6$-hydrocarbon) or as mixtures.

Typically, the content of the polymer in the solution leaving the reactor comprising the solvent, the polymer and the unreacted monomer and comonomer is from 10 to 50% by weight, preferably from 10 to 40% by weight, more preferably from 10 to 35% by weight, such as from 10 to 30% by weight.

In addition, other components may be added into the reactor. It is known to feed hydrogen into the reactor for controlling the molecular weight of the polymer formed during the polymerization. The use of different antifouling compounds is also known in the art. In addition, different kinds of activity boosters or activity retarders may be used for controlling the activity of the catalyst.

The process includes one or more polymerization reactors. Suitable reactors include unstirred or stirred, spherical, cylindrical and tank-like vessels and recirculating loop reactors and tubular reactors. Such reactors typically include feeding points for monomer, optional comonomer, solvent, catalyst and optional other reactants and additives and withdrawal points for polymer solutions. In addition, the reactors may include heating or cooling means.

The ethylene copolymer produced in the process of the present invention preferably has a density of between 850 and 960 kg/m$^3$, more preferably 855 and 940 kg/m$^3$ and most preferably 857 and 930 kg/m$^3$.

Furthermore, the ethylene copolymer preferably has a FRR$_{10/2}$ between 5 and 15, more preferably between 6 and 12 and most preferably, between 7 and 10, wherein the FRR$_{10/2}$ is the flow rate ratio between MFR$_{10}$ and MFR$_2$.

The reactor outlet stream in the process of the invention is heated to a temperature as described hereinbefore. The heating may be achieved by passing the solution through one or more flash heaters, or through one or more jacketed pipes, or through a heat exchanger. The heat medium may be high pressure steam or another medium.

The reactor outlet stream may also be heated by electrical heating.

After heating, the reactor outlet stream is fed to a separation stage, such as in a low pressure separator, in which volatile hydrocarbons, including solvent, unreacted monomers and comonomers, are removed from the polymer solution.

Low pressure separators are known. Frequently they are also referred to as flash separators or flash vessels. Such a flash vessel preferably has a generally cylindrical shape. Thereby, the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The liquid feed is passed to the separator which is operated at a reduced pressure. Thereby, a part of the liquid phase vaporizes and can be withdrawn as an overhead stream (or a vapour stream) from the low pressure separator. The part remaining in liquid phase is then withdrawn as a bottom stream or a liquid stream.

The temperature in the separator is typically from 130 to 300° C., more preferably from 140 to 280° C. and still more preferably from 150 to 250° C. The temperature should be sufficiently high to keep the viscosity of the solution at a suitable level but less than the temperature where the polymer is degraded.

The pressure in the separator is typically less than 20 bar, more preferably less than 15 bar, more preferably such as less than 12 bar, or even less than 10 bar. The pressure in the separator may down to even less than atmospheric pressure, such as 0.5 bar, or the pressure may be 1 bar or more.

The process of the invention may comprise more than one low pressure separation steps each conducted separately in a low pressure separator.

The present invention furthermore relates to the use of heat applied to the outlet stream of a polymerization reactor in which ethylene monomer and at least one alpha-olefin comonomer having 3 to 12 carbon atoms are copolymerized in solution for de-activating the polymerization catalyst in any of the above described embodiments.

In the following the present invention will be illustrated by examples and by referring to the following FIGURES which show:

FIG. 1: Time vs. polymerization temperature 130° C. to 190° C. for catalyst 1.

MEASUREMENT AND SIMULATION METHODS

Melt Flow Rate and Flow Rate Ratio

The melt flow rate (MFR) is determined according to ISO 1133 and is indicated in g/10 min. The MFR is determined at 190° C. for polyethylene and at a loading of 2.16 kg (MFR$_2$), 5.00 kg (MFR$_5$), 10.00 kg (MFR$_{10}$) or 21.6 kg (MFR$_{21}$).

The quantity FRR (flow rate ratio) is an indication of molecular weight distribution and denotes the ratio of flow rates at different loadings. Thus, for example, FRR$_{21/10}$ denotes the value of MFR$_{21}$/MFR$_{10}$.

Density

Density of the polymer is measured according to ISO 1183-1 method A using compression moulded samples. It is indicated in kg/m$^3$.

Amount of Active Catalyst Leaving the Reactor

The amount of catalyst leaving the reactor in an active state is determined by modelling of the reaction as can routinely done by the skilled person.

Catalyst Productivity

The productivity of the catalyst was determined as the amount of polymer produced divided by the amount of metal in the catalyst (in g-PO/mg-Hf).

Chemicals

Complex-1: [(Phenyl)(3-buten-1-yl)methylene(cyclopentadienyl)(2,7-di-tert-butylfluoren-9-yl) hafnium dimethyl was prepared as described in the patent application WO2018178152A1(C-2)

Complex-2: (Phenyl)(cyclohexyl)methylene(cyclopentadienyl)(2,7-di-tert-butylfluoren-9-yl)hafnium dimethyl was prepared as described in the patent application WO2018108918A1(IC)

Cocatalyst: N,N-Dimethylanilinium Tetrakis(pentafluorophenyl)borate (AB) (CAS 118612-00-3) was purchased from Boulder.

1-octene as co-monomer (99%, Sigma Aldrich) was dried over molecular sieves and degassed with nitrogen before use. Heptane and decane (99.9%, Sigma Aldrich) were dried under molecular sieves and degassed with nitrogen before use.

EXAMPLES

The effect of temperature on the catalyst activity (catalyst activity vs temperature) was investigated with two hafnocene catalysts, catalyst 1 and 2 using complex 1 and 2, respectively, as described above. The catalysts were used in ethylene copolymerization using decane, C$_{10}$, as the polymerization solvent and 1-octene, C$_8$, as comonomer.

Polymerization Procedure

Activation Procedure

Complex and borate are dissolved separately in toluene, then the borate solution is transferred and premixed with the complex solution (ratio AB/Complex=1.25 Molar ratio) for 45 seconds and their mixture is injected immediately in the reactor.

Typical Polymerization Procedure:

The vessels were loaded inside a glovebox utilizing a 3-axis liquid handling robot. A pre-weighed glass vial with stirring paddles was sealed and purged with nitrogen. A volume of about 4.1 mL of corresponding solvent (decane) was filled in each PPR reactor. Then, adequate amount of triethyl aluminium (TEA) as scavenger was added, along with precise volume of octene as co-monomer at room temperature. The ethylene pressure was set to 10 bar to check any leaks. Then, the temperature and pressure had been increased to the set value (e.g. T=190° C. and 24 bar) and once the steady state was reached, the corresponding volume of pre-activated catalyst (0.9 mL) as a solution in toluene had been injected in the reactor to start the polymerization under mechanical stirring. The run was quenched with $CO_2$ after the set amount of ethylene uptake had been reached (5 min as a maximum run time). The glass vials had been dried by vacuum centrifuge and weighed.

Productivity has been calculated as follows:

$$\text{Productivity}(g \text{ polymer per mg hafnocene}) = \frac{\text{Yield}(g)}{\text{Hafnocene Amount(mg)}}$$

The results are displayed in FIG. 1, which illustrates the time (Sec) vs temperature, with the conditions: pre-contact time=45 sec, AB/Complex1=1.25 molar ratio, P=24 bar, and $C_8/C_{10}$=25 wt %.

It was recorded when the polymerization activity of catalyst 1 is below 5 and below 10% of the maximum activity observed as a function of the temperature. Therefore, at high temperatures >210° C. catalyst 1 can be considered completely deactivated. The same applies for catalyst 2 which is not shown in FIG. 1.

The invention claimed is:

1. A polymerization process, comprising:
a) supplying a feed containing ethylene and at least one alpha-olefin having 3 to 12 carbon atoms in a hydrocarbon solvent to a polymerization reactor,
b) contacting the feed of step a) in the polymerization reactor with a catalyst to form a reaction mixture containing an ethylene-alpha-olefin co-polymer,
c) withdrawing the reaction mixture from the polymerization reactor as a reactor outlet stream which comprises the ethylene-alpha-olefin co-polymer, unreacted monomer and comonomer, catalyst, and hydrocarbon solvent,
d) heating the reactor outlet stream to a temperature which is at least 5° C. higher than a temperature of the reaction mixture at an outlet of the polymerization reactor for a time period of between 1 and 250 seconds in order to de-activate the polymerization catalyst, and
e) separating hydrocarbon solvent, monomer and comonomer from the reactor outlet stream and recycling it back to the polymerization reactor without further purification steps;
wherein the polymerization catalyst is a metallocene catalyst, wherein the metallocene catalyst comprises a hafnocene catalyst; and wherein the hafnocene catalyst comprises a hafnocene catalyst complex, comprising a cyclopentadienyl (Cp) ligand, a fluorenyl (Flu) ligand and a covalent bridge connecting the two ligands.

2. The process according to claim 1 wherein the reactor outlet stream is heated to a temperature which is at least 10° C. higher than the temperature of the reaction mixture at the outlet of the reactor.

3. The process according to claim 2 wherein the reactor outlet stream is heated to a temperature which is at least 15° C. higher than the temperature of the reaction mixture at the outlet of the reactor.

4. The process according to claim 1 wherein the reactor outlet stream is heated to a prescribed temperature for a time period of between 10 and 200 seconds.

5. The process according to claim 1 wherein no catalyst de-activation agent is added to the reactor outlet stream before entering separation stage e).

6. The process according to claim 1 wherein the reactor outlet stream between leaving the polymerization reactor and entering separation stage e) apart from being heated in step d) is not subjected to any further treatment steps.

7. The process according to claim 1 wherein the reactor outlet stream is heated to a temperature of at least 180° C.

8. The process according to claim 1 wherein after heat treatment of the reactor outlet stream no more than 10 wt % of the catalyst is in an active state.

9. The process according to claim 1, wherein a polymerization temperature in the polymerization reactor is in a range of from 100° C. to 250° C.

10. The process according to claim 1, wherein a pressure in the polymerization reactor is in a range of from 50 to 300 bar.

11. A process for deactivating a polymerization catalyst, the process comprising:
applying heat to an outlet stream of a polymerization reactor in which ethylene monomer and at least one alpha-olefin comonomer having 3 to 12 carbon atoms are copolymerized in solution wherein the polymerization catalyst is a metallocene catalyst, wherein the metallocene catalyst comprises a hafnocene catalyst; and
wherein the hafnocene catalyst comprises a hafnocene catalyst complex, comprising a cyclopentadienyl (Cp) ligand, a fluorenyl (Flu) ligand and a covalent bridge connecting the two ligands.

* * * * *